(12) United States Patent  (10) Patent No.: US 7,254,424 B1
Reichert                   (45) Date of Patent:      Aug. 7, 2007

(54) MOBILE TELEPHONE STATION

(76) Inventor: William E. Reichert, 241 Frieda St., Montgomery, NY (US) 12549

( * ) Notice: Subject to any disclaimer, the term of this patent is extended or adjusted under 35 U.S.C. 154(b) by 367 days.

(21) Appl. No.: 10/824,748

(22) Filed: Apr. 15, 2004

Related U.S. Application Data

(60) Provisional application No. 60/462,977, filed on Apr. 15, 2003.

(51) Int. Cl.
    H04M 1/00 (2006.01)
(52) U.S. Cl. ............... 455/575.1; 455/575.1; 455/347; 379/428.04; 379/436
(58) Field of Classification Search ............. 455/569.1, 455/575.1, 575.9, 90.3, 344–349; 379/428.01, 379/428.02, 428.04, 436
    See application file for complete search history.

(56) References Cited

U.S. PATENT DOCUMENTS

| 4,368,359 | A | | 1/1983 | Genaro et al. |
| 5,033,709 | A | * | 7/1991 | Yuen ..................... 248/313 |
| 5,348,347 | A | | 9/1994 | Shink |
| 5,539,821 | A | | 7/1996 | Blonder |
| 5,605,312 | A | | 2/1997 | Elder et al. |
| 5,697,071 | A | | 12/1997 | Fan |
| 5,745,565 | A | * | 4/1998 | Wakefield ............... 379/446 |
| 5,748,727 | A | | 5/1998 | Lundell et al. |
| 5,822,427 | A | | 10/1998 | Braitberg et al. |
| 5,940,502 | A | | 8/1999 | Hirai et al. |
| 5,963,014 | A | * | 10/1999 | Chen ..................... 320/110 |
| 5,992,807 | A | | 11/1999 | Tarulli |
| 6,084,963 | A | * | 7/2000 | Hirai et al. ............. 379/446 |
| 6,141,417 | A | | 10/2000 | Lopez et al. |
| 6,229,893 | B1 | | 5/2001 | Chen |
| 6,246,766 | B1 | | 6/2001 | Walsh |
| 6,341,218 | B1 | | 1/2002 | Poplawsky et al. |
| 6,396,925 | B1 | | 5/2002 | Close |
| 6,438,229 | B1 | * | 8/2002 | Overy et al. ............ 379/446 |
| 6,570,987 | B1 | * | 5/2003 | Saarikko ............. 379/428.01 |
| 6,832,745 | B2 | * | 12/2004 | Lindsay ................ 248/311.2 |
| 2002/0115480 | A1 | * | 8/2002 | Huang .................... 455/573 |
| 2003/0128840 | A1 | * | 7/2003 | Luginbill et al. ......... 379/455 |
| 2004/0165367 | A1 | * | 8/2004 | Reah ..................... 361/797 |

* cited by examiner

Primary Examiner—Simon Nguyen
(74) Attorney, Agent, or Firm—Krieg DeVault LLP

(57) ABSTRACT

A mobile telephone station is disclosed having a receptacle comprising a bottom and one or more upstanding sides defining a compartment configured to removably receive a mobile telephone through a top opening. The receptacle may have one or more clips for retaining a battery charger cord. The receptacle may have stabilizing means for mounting the receptacle or supporting it on a surface. The station may further comprise an accessory secured to the receptacle, the accessory comprising one or more of a picture frame, message board, key holder, and pen and paper holder, as desired.

80 Claims, 8 Drawing Sheets

MOBILE TELEPHONE STATION

This application claims priority based on U.S. Provisional Patent Application Ser. No. 60/462,977, entitled "Mobile Telephone Station", and filed Apr. 15, 2003.

DETAILED DESCRIPTION OF VERSIONS OF THE INVENTION

Figure 1:
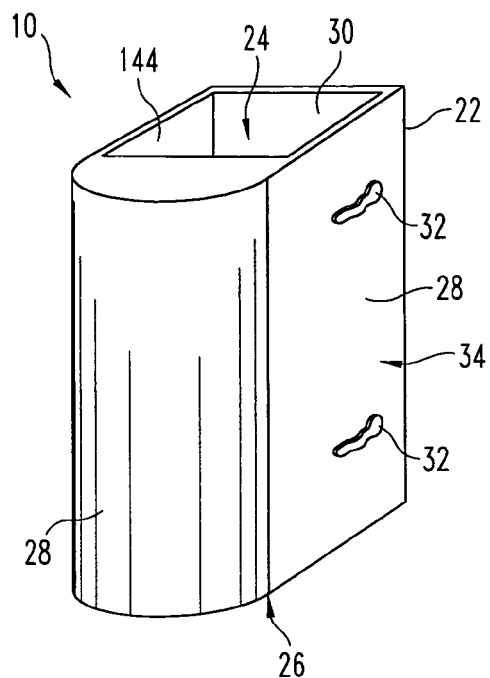
FIG. 1 illustrates a perspective view of a receptacle in accordance with one version of the present invention.
Figure 2:
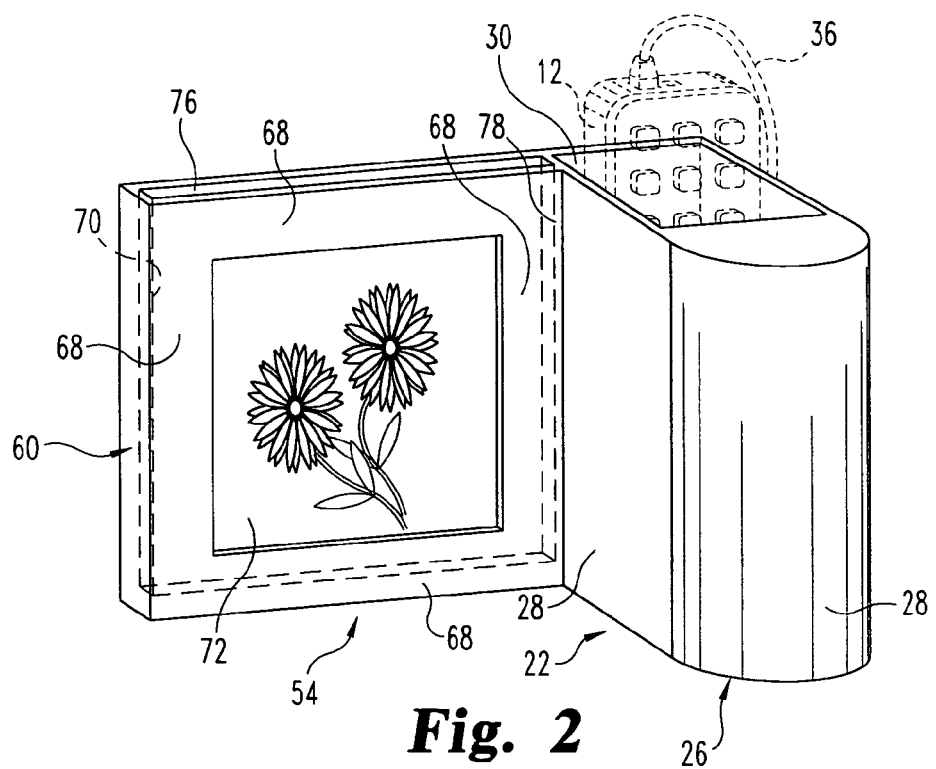
FIG. 2 illustrates a perspective view of one version of a station comprising a receptacle portion and an accessory portion comprising a square picture frame.
Figure 3:
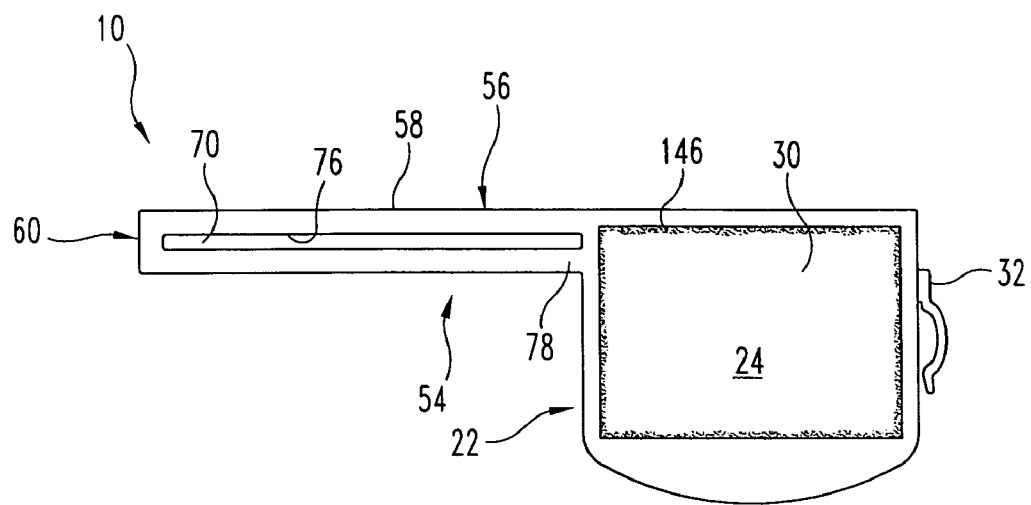
FIG. 3 illustrates a top view of the station of FIG. 2.
Figure 4:
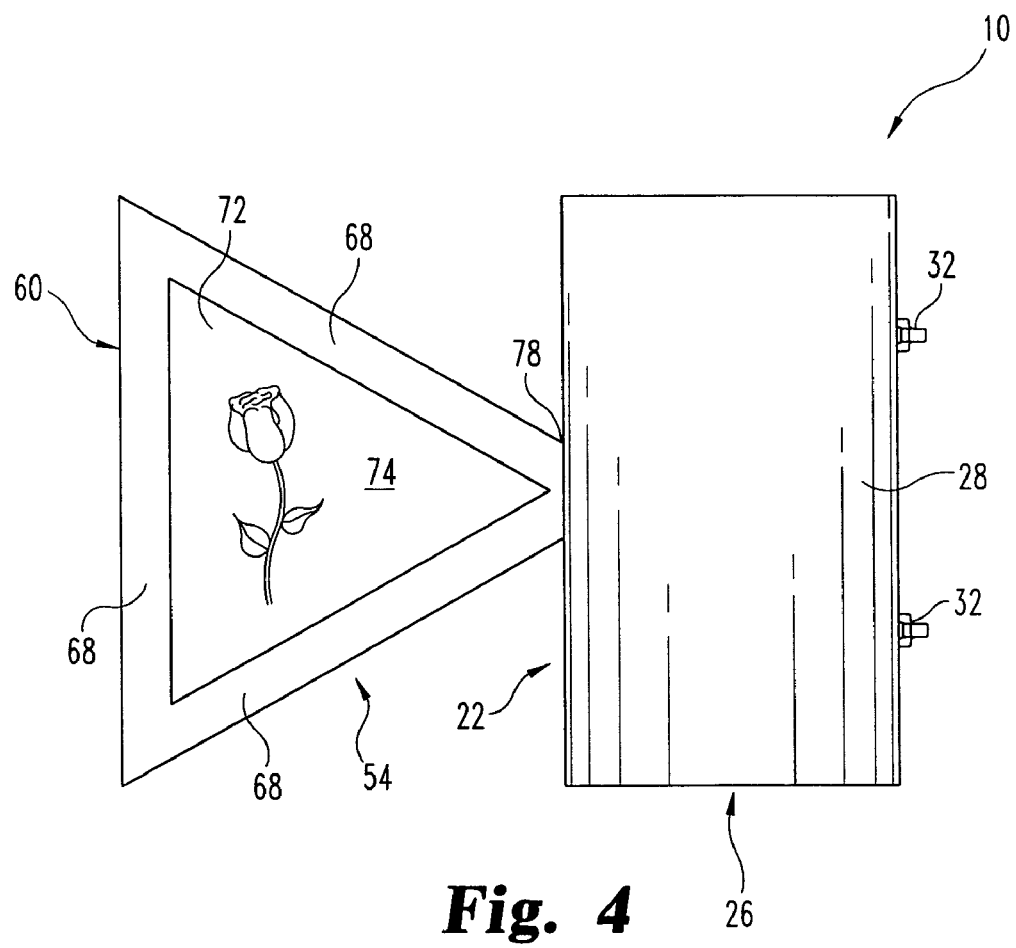
FIG. 4 illustrates a front view of a version of the station comprising a receptacle portion and an accessory portion comprising a triangular picture frame.

Although the disclosure hereof is detailed and exact in order to enable those skilled in the art to practice the invention, the physical versions herein disclosed merely exemplify the invention which may be embodied in other specific structure. The scope of the invention is defined in the claims appended hereto.

FIGS. 1-20 illustrate various versions of a mobile telephone station 10 in accordance with the present invention. The station 10 may be used for simply storing a mobile telephone 12 while it is not in use or for holding the mobile telephone during recharging periods. In one version, the station 10 is located near an electric outlet 14 in which a battery charger 16 may be plugged at an outlet end 18 thereof for recharging the battery (not shown) of the mobile telephone using the charging end 20 thereof.

As shown in FIG. 1, in one version, the station 10 comprises a receptacle 22 having a compartment 24 configured for removably receiving a mobile telephone 12. In other versions, the receptacle 22 comprises a bottom 26, one or more upstanding sides 28 and a top opening 30, the bottom 26 and sides 28 defining the compartment 24 configured to receive the mobile telephone 12 through the top opening 30. In yet other versions, one or more clips 32, as shown by example in FIG. 1, are provided on a first exterior portion 34 of the sides 28 for removably retaining the wire or cord 36 of a batter charger 16. In yet other versions, stabilizing means 38 are provided on a second exterior portion 40 of the sides 28 for locating the station 10 as desired on a surface 42 or against an object 44 such as a wall. Examples of stabilizing means 38 are shown in FIGS. 15A-17, and include an extendable-retractable easel arm 46, apertures 48 for receiving mounting members 50 such as tacks, pegs, nails or screws extending from a wall 44, and one or more adhesive strips or magnets 52.

Figure 16A:
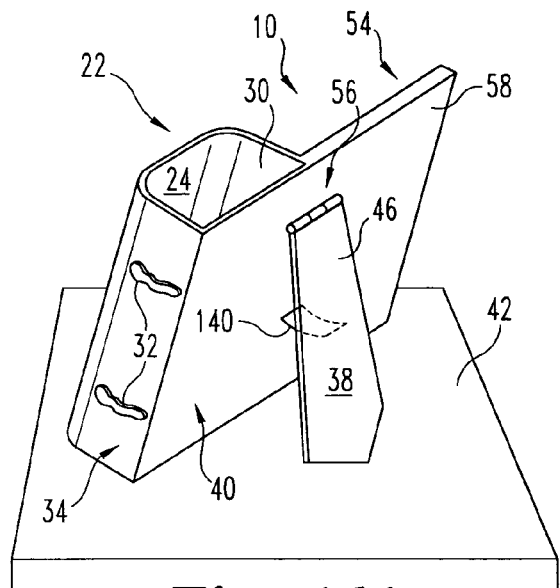
FIG. 16A illustrates a version of stabilizing means comprising an easel arm integrated on a common back of one version of a station.
Figure 16B:
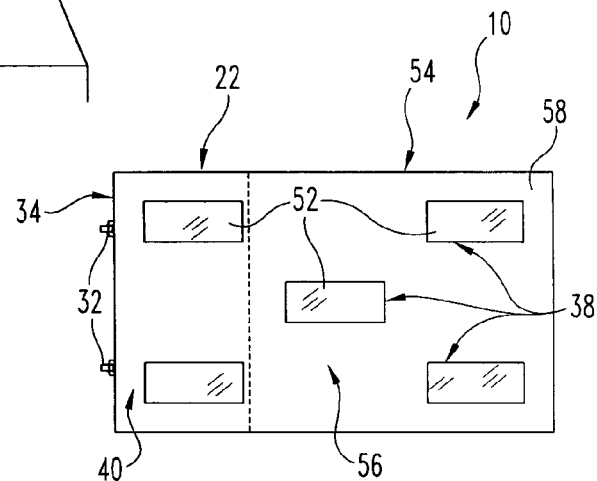
FIG. 16B illustrates another version of stabilizing means comprising magnets on the second exterior portion supplemented by magnets on the back of the accessory portion.
Figure 17:
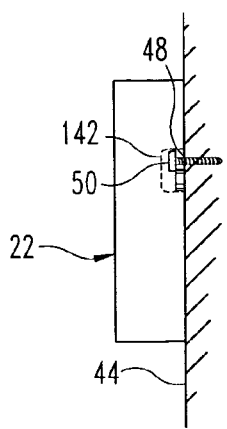
FIG. 17 illustrates a side cross-sectional view of an aperture defining a cavity removably receiving mounting means extending from a wall.
Figure 16C:
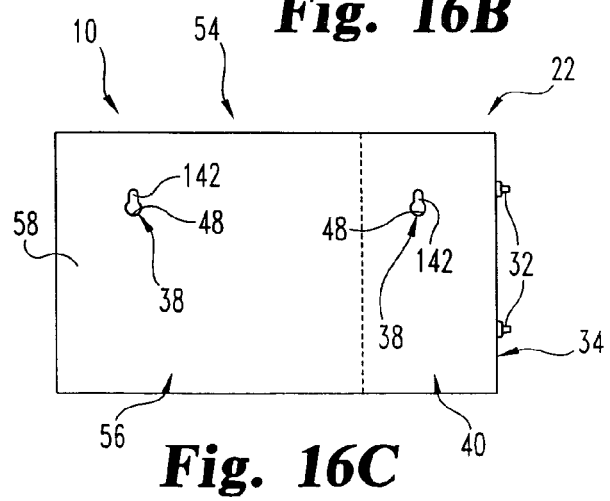
FIG. 16C illustrates a version of stabilizing means comprising an aperture on the second exterior portion complemented by an aperture on the back of the accessory portion.

In an alternative version shown in FIGS. 2-14, the station 10 comprises a receptacle portion 22 and an accessory portion 54 adjacently secured to the receptacle portion to define a common back 56. As shown in FIGS. 16A-16C, in one version, the common back 56 includes the second exterior portion 40 of the upstanding sides 28. In other versions, the back 58 of the accessory portion 54 comprises stabilizing means 38 for locating the station 10 that are complimentary or supplementary to the stabilizing means of the receptacle portion 22. In yet other versions, the common back 56 comprises integrated stabilizing means 38 for the accessory portion 54 and receptacle portion 22.

The accessory portion 54 of the station 10 may comprise any useful or ornamental household device. As shown in FIGS. 2, 6, 10 and 13, in various versions the accessory portion 54 may comprise a picture frame 60, a pen and paper holder 62, a key holder 64, and a message board 66.

Referring now to FIGS. 2-5, a picture frame 60 comprises one or a plurality of frame members 68 defining a sleeve 70 and a viewing window 72. In one version, the sleeve 70 is configured for receiving variably-sized pictures and photographs 74. In other versions, the sleeve 70 is configured for receiving a standard 3½inch×5 inch photograph 74. In yet other versions, the sleeve 70 is configured for receiving a standard 4 inch×6 inch photograph 74. One of the frame members 68 may comprise a slot 76 for removably inserting a picture or photograph 74 into the sleeve 70.

The one or plurality of frame members 68 may define any configuration which provides a lateral edge 78 on one of the members 68 suitable for securing to the receptacle 22. In one version, the frame member or members 68 define a configuration selected from the group of shapes consisting of a triangle (FIG. 4), a square (FIG. 2), a rectangle, and a circle (FIG. 5).

Figures 5, 6:
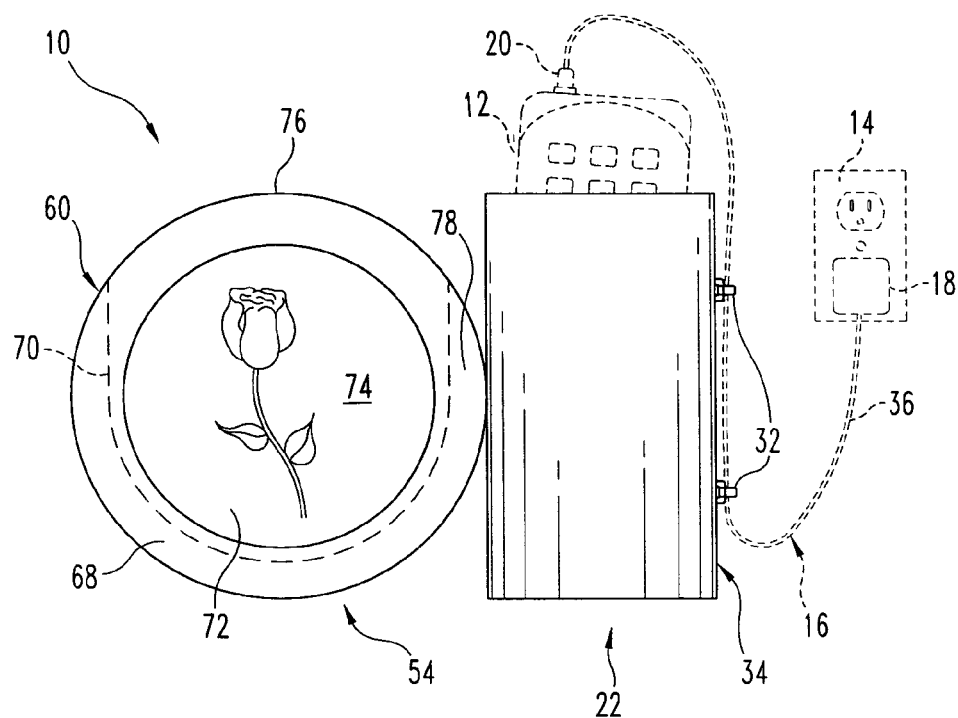
FIG. 5 illustrates a front view of a version of a station comprising a receptacle portion and an accessory portion comprising a circular picture frame.
FIG. 6 illustrates a perspective view of a version of a station comprising a receptacle portion and an accessory portion comprising a version of a pen and paper holder.
Figure 7:
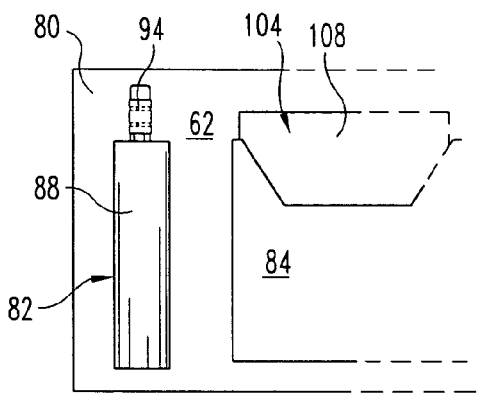
FIG. 7 illustrates a version of a pen retainer on a pen and paper holder accessory.
Figure 8:
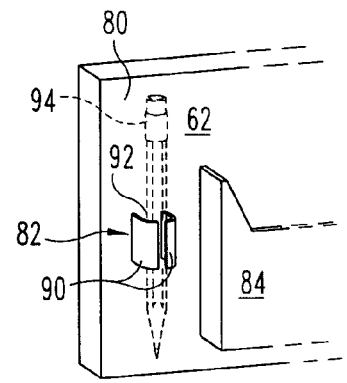
FIG. 8 illustrates another version of a pen retainer in a pen and paper holder accessory.

Referring now to FIGS. 6-9, a pen and paper holder 62 comprises a generally flat panel 80 having a lateral edge 78 suitable for securing to the receptacle 22 and having a pen retainer 82 and a paper pad retainer 84. As shown in FIG. 6, in one version, the pen retainer 82 comprises a strap 86. As shown in FIG. 7, in other versions, the pen retainer 82 comprises a sleeve 88. As shown in FIG. 8, in yet other versions, the pen retainer 82 comprises opposing retention brackets 90 defining a retention space 92, the opposing retention brackets 90 configured for frictionally retaining a pen, pencil or other writing utensil 94 within the retention space 92.

Figure 9:
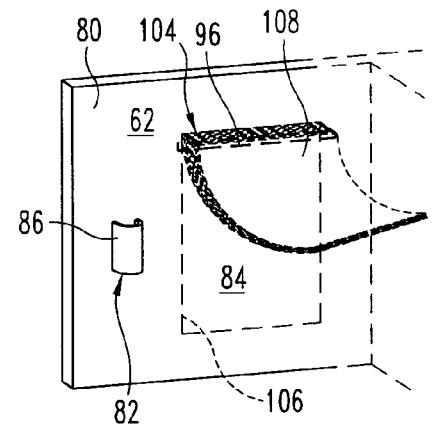
FIG. 9 illustrates a version of a paper retainer in a pen and paper holder.

Referring now to FIGS. 6 and 9, the paper pad retainer 84 generally comprises a pocket 96. In one version, the pocket 96 comprises a bottom 98, upstanding side walls 100 and a front piece 102 extending between the side walls, and may be configured of variable dimensions in order to removably receive pads of paper 104 of varying sizes. In other versions, the pocket 96 is configured to removably and closely receive a generally rigid backing 106 from a pad of paper 104 such that the paper 108 is cantileveredly supported by the backing 106 within the pocket 96.

It will be understood by those of ordinary skill in the art that any reference to a pen 94 includes any suitable writing utensil, such as a pen, pencil, marker or crayon.

Figure 10:
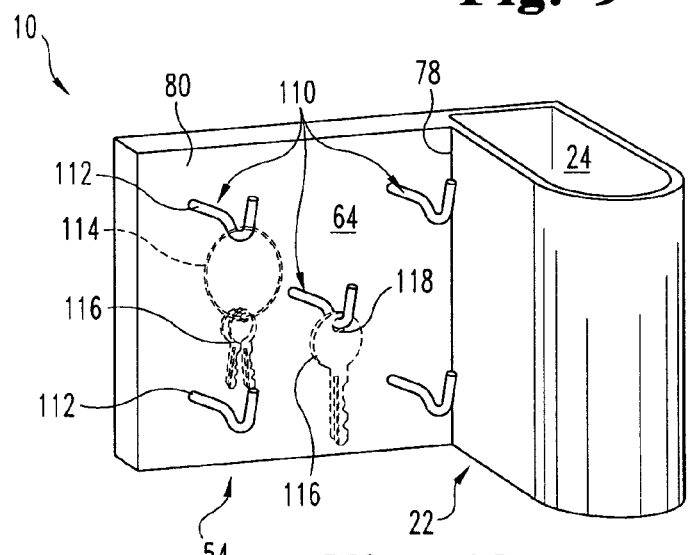
FIG. 10 illustrates a perspective view of a version of a station comprising a receptacle portion and an accessory portion comprising a key holder.
Figure 11:
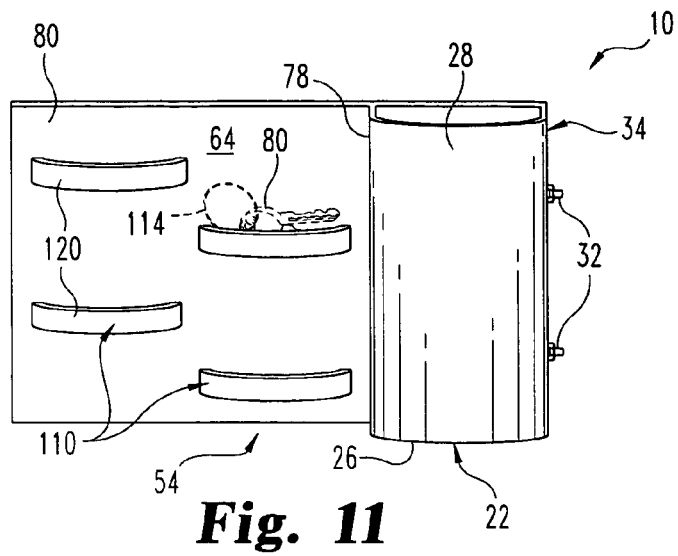
FIG. 11 illustrates another version of a key retainer different from the version of a key retainer shown in FIG. 10.

Referring now to FIGS. 10-11, a key holder 64 comprises a generally flat panel 80 having a lateral edge 78 suitable for securing to the receptacle 22, and having one or more key retainers 110 extending substantially outwardly therefrom. In one version, a key retainer 110 comprises a hook or peg 112 configured to be removably received by a key chain 114 or a hole 118 in a single key 116. In other versions, a key retainer 110 comprises a ledge 120 configured for supporting a key 116 or a set of keys on a key chain 114.

Figure 12:
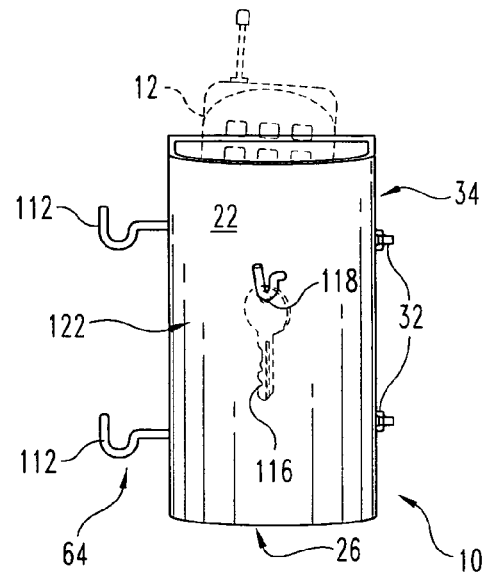
FIG. 12 illustrates a version of a station comprising a receptacle portion having a key retainer secured thereto.

It will be appreciated by those of ordinary skill in the art that one or more key retainers 110 may be secured directly to a third exterior portion 122 of the receptacle 22 rather than to a generally flat panel 80, as shown in FIG. 12. In one version, the station 10 comprises a key holder 64 secured to the third exterior portion 122 and an accessory portion 54 other than a key holder.

Figure 13:
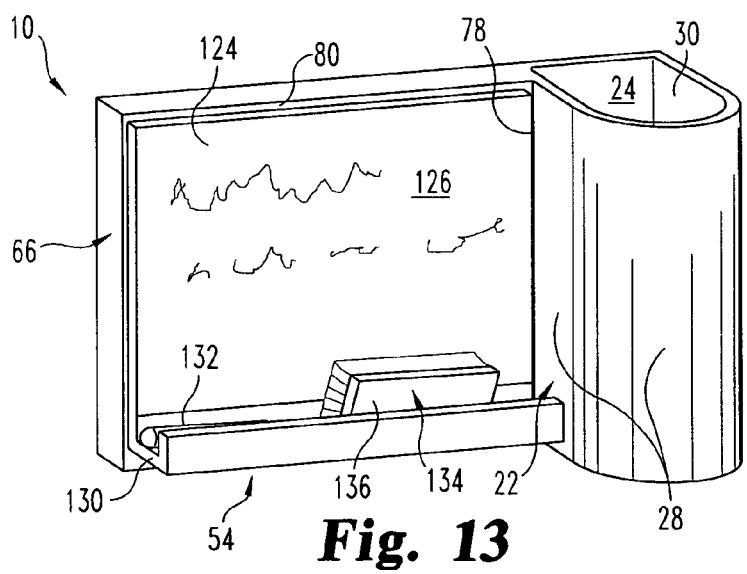
FIG. 13 illustrates a perspective view of a version of a station comprising a receptacle portion and an accessory portion comprising a message board.
Figure 14:
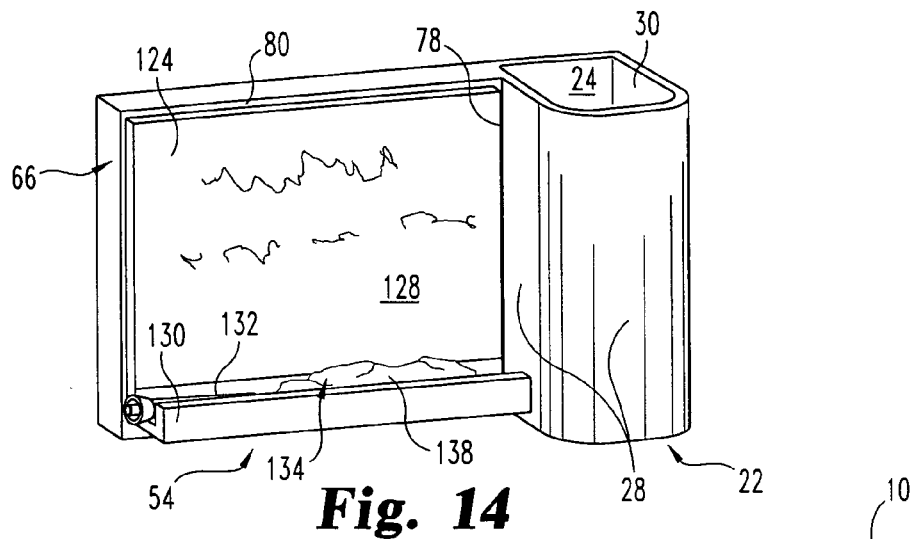
FIG. 14 illustrates a perspective view of a version of a station comprising a receptacle portion and an accessory portion comprising a different version of a message board.
Figure 15A:
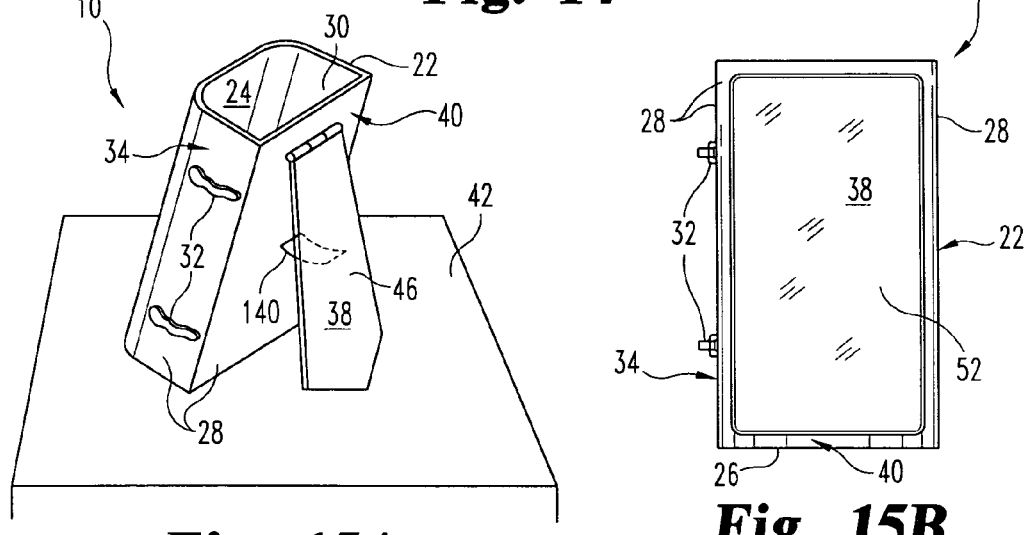
FIG. 15A illustrates a version of stabilizing means comprising an easel arm.
Figure 15B:
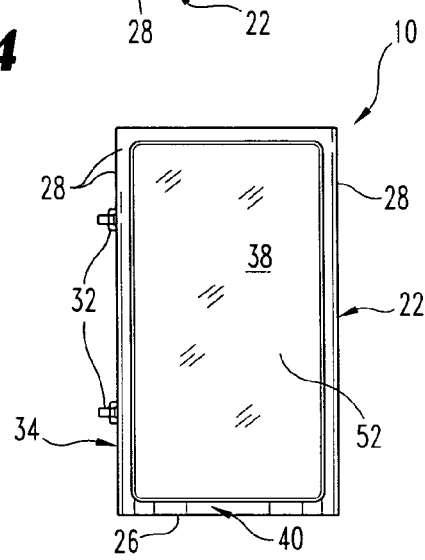
FIG. 15B illustrates another version of stabilizing means comprising a magnet.
Figure 15C:
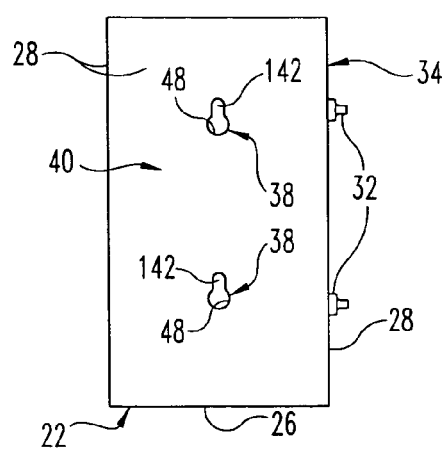
FIG. 15C illustrates another version of stabilizing means comprising a plurality of apertures.

Referring now to FIGS. 13-14, a message board 66 comprises a generally flat panel 80 having a lateral edge 78 suitable for securing to the receptacle 22 and defining a writing area 124. In one version, the message board 66 comprises a chalk board 126. In other versions, the message board 66 comprises a dry- or wet-erase board 128. In yet other versions, the message board 66 further comprises a lip 130 configured for retaining one or more suitable writing utensils 132, such as chalk or markers. In yet other versions, the lip 130 is also configured for retaining erasing means 134 for erasing the writing area 124, such as a conventional eraser 136 or a wiping cloth 138.

The receptacle 22 may be of any dimension for defining a suitable compartment 24 for removably receiving a mobile telephone 12. In one version, the receptacle 22 has a height between about 3 inches and about 7 inches. In other versions, the receptacle 22 has a depth between about 3 inches and about 5 inches. In yet other versions, the receptacle 22 has a width between about 3¾ inches and about 6 inches. In yet other versions, the receptacle 22 is about 5½ inches tall, about 3½ inches deep, and about 4 inches wide.

The cross sectional configuration of the compartment 24 may be generally rectilinear or circular. In one rectilinear version, the compartment 24 has cross sectional dimensions of between about 2 and about 3 inches in depth and between about 3 and about 4 inches in width. In other rectilinear versions, the compartment 24 has cross section dimensions of about 2½ inches deep and about 3½ inches wide. In one circular version, the compartment 24 has a major cross sectional diameter between about 3 inches and about 4 inches. In other circular versions, the compartment 24 has a major cross sectional diameter of about 3½ inches.

In one version, the total width of the station 10 including a receptacle portion 22 and an accessory portion 54 is between about 8 inches and about 12 inches. In other versions, the total width of the station 10 is about 10 inches.

In versions comprising a picture frame 60, the viewing window 72 has an area between about 15 square inches and about 30 square inches. In versions comprising a message board 66, the writing area 124 has an area between about 15 square inches and about 40 square inches.

Referring now to FIGS. 15A-17, stabilizing means 38 for locating the station 10 may be provided in connection with the station. Stabilizing means 38 may be provided for selectively supporting the station 10 on a surface 42 such as a table, desk, ledge, windowsill or countertop. In one version, stabilizing means 38 comprises an easel arm 46 that is selectively retractable and extendable. In other versions, an extension restrictor 140 is provided extending between the back 56 or second exterior portion 40 of the station 10 and the easel arm 46.

Stabilizing means 38 may also be provided for mounting or affixing the station 10 to an object 44 such as a wall or a metallic surface such as a refrigerator or filing cabinet. In one version, stabilizing means 38 comprises one or more adhesive strips or magnets 52 secured to the back 56. In other versions, stabilizing means 38 comprises one or more apertures 48 defining a cavity 142 in the back 56 configured to supportively receive one or more mounting members 50 extending from the object 44. In yet other versions, mounting members 50 comprise nails, screws, tacks, or pegs.

Figure 18:
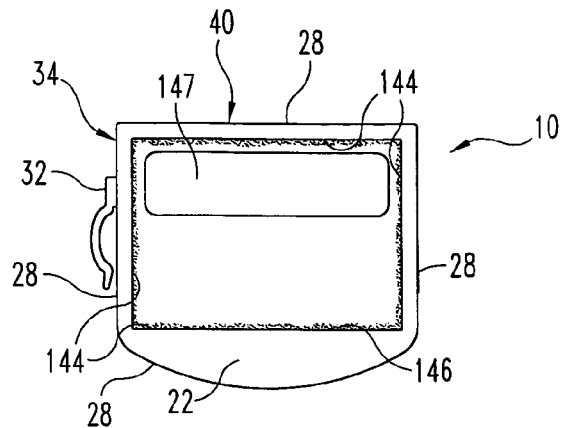
FIG. 18 illustrates a top view of a receptacle portion having an interior surface comprising padding.

As illustrated in FIG. 18, the interior surface 144 of the compartment 24 may be substantially lined with padding 146. In one version, the padding 146 comprises a felt lining. In other versions, the padding 146 comprises a rubber coating. In yet other versions, the padding 146 comprises foam. In yet other versions, additional rubber or foam pads 147 may be removably inserted into the compartment 24. The pads 147 are configured to prevent smaller mobile telephones 12 from being positioned substantially at the bottom of the compartment. In one version, a pad 147 is inserted so that it is positioned at the bottom of the compartment and has a thickness configured to substantially upwardly boost the position of a mobile telephone 12 within the compartment. In other versions, the pad 147 is inserted so that it is positioned substantially against the interior surface 144 or padding 146 of the compartment 24 in order to wedge a smaller mobile telephone 12 in an upper position in the compartment.

Figure 19:
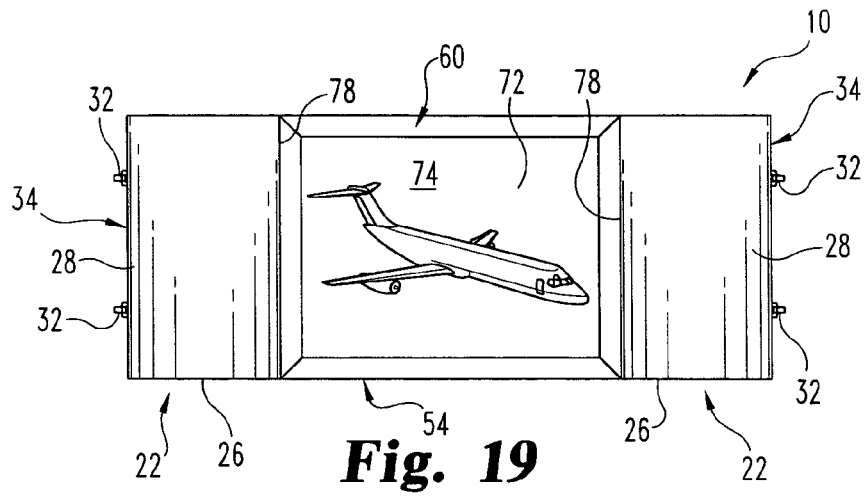
FIG. 19 illustrates an alternative version of a station comprising two receptacle portions.
Figure 20:
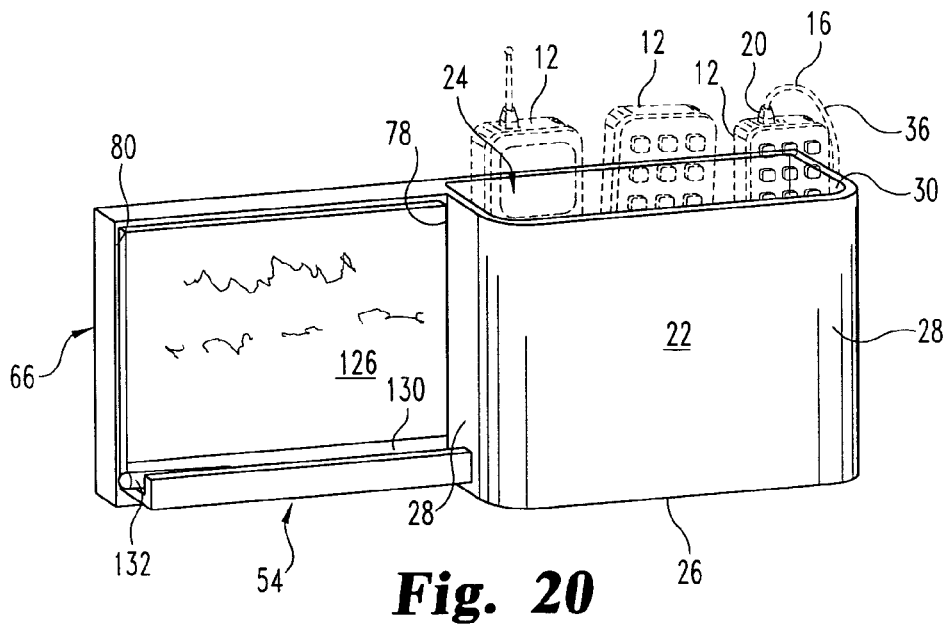
FIG. 20 illustrates yet another version of a station comprising a multiple use receptacle portion.

As illustrated in FIGS. 19-20, a station 10 may be provided with more than one receptacle 22 or with a multi-use receptacle 22 configured for receiving two or more mobile telephones 12.

In operation, the station 10 is located as desired by the user thereof with the stabilizing means 38. In one version, the user locates the station 10 in a designated position for storing the user's mobile telephone 12 during non-use and/or during periods of recharging. In other versions, the designated position is relatively near an electrical outlet 14. The user inserts the mobile telephone 12 into the compartment 24 through the top opening 30. In one version, the mobile telephone 12 is inserted right-side-up. In other versions, the mobile telephone 12 is inserted upside-down. A mobile telephone battery charger 16 having an outlet end 18 and a charging end 20 may be used to recharge a mobile telephone battery (not shown). With the charging end 20 plugged into the mobile telephone 12 and the outlet end 18 plugged into an electrical outlet 14, the mobile telephone 12 may be inserted into the compartment 24. The wire or cord 36 connecting the charging end 20 to the outlet end 18 may be inserted into the clips 32 for retaining the wire in place. During periods of mobile telephone use or non-storage in the station 10, the battery charger wire 36 may be kept retained in the clips 32 with the charging end 20 left free either dangling or otherwise retained within the compartment 24 to prevent dangling. The station 10 is selectively provided with an accessory portion 54 as desired by the user, versions of which are disclosed herein.

While specific versions of the invention have been shown and described herein for purposes of illustration, the protection offered by any patent which may issue upon this application is not strictly limited to the disclosed version; but rather extends to all structures, steps and arrangements which fall fairly within the scope of the claims which are appended hereto.

What is claimed is:

1. A mobile telephone storage station, comprising: a receptacle comprising a bottom, one or more upstanding sides, and a top opening, said sides and said bottom defining a compartment, said sides having first and second exterior portions, said first exterior portion comprising at least one clip configured for removably retaining a charging cord, said second exterior portion comprising stabilizing means for locating said station as desired, said compartment configured for removably receiving a mobile telephone through said top opening, and an accessory portion selected from the group consisting of a picture frame, a pen and paper holder device, a key holder device, and a message board, adjacently secured to said receptacle and having a back common with said receptacle, said back being partially comprised of said second exterior portion, and a second stabilizing means complimentary or supplementary or integrated with said stabilizing means of said second exterior portion.

2. The station of claim 1 wherein said receptacle has a generally rectilinear cross sectional configuration.

3. The station of claim 2 wherein said compartment has dimensions between about 2 and about 3 inches in depth and between about 3 and about 4 inches in width.

4. The station of claim 2 wherein said compartment has dimensions of about 2½inches deep and about 3½inches wide.

5. The station of claim 1 wherein said receptacle has a generally circular cross sectional configuration.

6. The station of claim 5 wherein said compartment has a major cross sectional diameter of between about 3 inches and about 4 inches.

7. The station of claim 5 wherein said compartment has a major cross sectional diameter of about 3½inches.

8. The station of claim 1 wherein said stabilizing means is configured for locating said station on a surface or against an object as desired.

9. The station of claim 1 wherein said stabilizing means comprises an extendable retractable easel arm secured to said second exterior portion.

10. The station of claim 1 wherein said stabilizing means comprises at least one aperture in said second exterior portion, said aperture being configured for receiving a mounting member, said mounting member comprising one member of the group consisting of tacks, pegs, nails or screws, said mounting member extending from a generally vertical surface.

11. The station of claim 1 wherein said stabilizing means comprises at least one magnet secured to said second exterior portion.

12. The station of claim 1 wherein said stabilizing means comprises at least one adhesive strip secured to said second exterior portion.

13. The station of claim 1 wherein said receptacle has a height between about 3 inches and about 7 inches, a depth between about 3 inches and about 5 inches, and a width between about 3¼inches and about 6 inches.

14. The station of claim 1 wherein said receptacle is about 5½inches tall, about 3½inches deep and about 4 inches wide.

15. The station of claim 1 wherein said compartment is configured for removably receiving two or more mobile telephones through said top opening.

16. The station of claim 1 wherein said compartment comprises an interior surface, said interior surface being substantially lined with a padding.

17. The station of claim 16 wherein said padding comprises a material selected from the group consisting of felt lining, rubber coating, and foam.

18. The station of claim 16 further comprising an additional pad removably inserted into said compartment, said additional pad comprising a material selected from the group consisting of rubber, felt, and foam.

19. The station of claim 18 wherein said pad is configured to positively displace a mobile telephone of a relatively smaller size configuration from a position in said compartment substantially toward said bottom.

20. The station of claim 19 wherein said pad is inserted substantially at said bottom of said compartment and having a thickness configured to substantially upwardly boost the position of said mobile telephone stored within said compartment.

21. The station of claim 19 wherein said pad is inserted substantially against an upstanding portion of said interior surface and having a thickness configured to require said mobile telephone to be wedged in an upper position within said compartment.

22. The station of claim 1 wherein said key holder device comprises at least one hook or peg member being configured for removably receiving a key chain or a hole in a single key.

23. A mobile telephone storage station, comprising: a receptacle portion and an accessory portion, said receptacle portion comprising a bottom, one or more upstanding sides, and a top opening, said sides and said bottom defining a compartment, said sides having first and second exterior portions, said first exterior portion comprising at least one clip configured for removably retaining a charging cord, said compartment configured for removably receiving a mobile telephone through said top opening, said accessory portion being a picture frame adjacently secured to said receptacle portion generally opposite said first exterior portion and having a back common with said receptacle portion, said picture frame comprising at least one frame member defining a sleeve and a viewing window, said one frame member comprising an edge secured to said receptacle portion, said sleeve being configured for removably receiving variably sized pictures and photographs, said back being partially comprised of said second exterior portion, said back comprising stabilizing means for locating said station as desired.

24. The station of claim 23 wherein said receptacle has a generally rectilinear cross sectional configuration.

25. The station of claim 24 wherein said compartment has dimensions between about 2 and about 3 inches in depth and between about 3 and about 4 inches in width.

26. The station of claim 24 wherein said compartment has dimensions of about 2½ inches deep and about 3½ inches wide.

27. The station of claim 23 wherein said receptacle has a generally circular cross sectional configuration.

28. The station of claim 27 wherein said compartment has a major cross sectional diameter of between about 3 inches and about 4 inches.

29. The station of claim 27 wherein said compartment has a major cross sectional diameter of about 3½ inches.

30. The station of claim 23 wherein said stabilizing means is configured for locating said station on a surface or against an object as desired.

31. The station of claim 23 wherein said stabilizing means comprises an extendable retractable easel arm secured to said second exterior portion.

32. The station of claim 31 wherein said easel arm comprises an extension restrictor extending between said back and said easel arm.

33. The station of claim 23 herein said stabilizing means comprises at least one aperture in said second exterior portion, said aperture being configured for receiving a mounting member, said mounting member comprising one member of the group consisting of tacks, pegs, nails or screws, said mounting member extending from a generally vertical surface.

34. The station of claim 23 wherein said stabilizing means comprises at least one magnet secured to said second exterior portion.

35. The station of claim 23 wherein said stabilizing means comprises at least one adhesive strip secured to said second exterior portion.

36. The station of claim 23 wherein said receptacle has a height between about 3 inches and about 7 inches, a depth between about 3 inches and about 5 inches, and a width between about 3¼ inches and about 6 inches.

37. The station of claim 23 wherein said receptacle is about 5½ inches tall, about 3½ inches deep and about 4 inches wide.

38. The station of claim 23 wherein said compartment is configured for removably receiving two or more mobile telephones through said top opening.

39. The station of claim 23 wherein said compartment comprises an interior surface, said interior surface being substantially lined with a padding.

40. The station of claim 39 wherein said padding comprises a material selected from the group consisting of felt lining, rubber coating, and foam.

41. The station of claim 39 further comprising an additional pad removably inserted into said compartment, said additional pad comprising a material selected from the group consisting of rubber, felt, and foam.

42. The station of claim 41 wherein said pad is configured to positively displace a mobile telephone of a relatively smaller size configuration from a position in said compartment substantially toward said bottom.

43. The station of claim 42 wherein said pad is inserted substantially at said bottom of said compartment and having a thickness configured to substantially upwardly boost the position of said mobile telephone stored within said compartment.

44. The station of claim 42 wherein said pad is inserted substantially against an upstanding portion of said interior surface and having a thickness configured to require said mobile telephone to be wedged in an upper position within said compartment.

45. The station of claim 23 wherein said sides further comprise a third exterior portion, said third exterior portion having one or more key retainers secured thereto.

46. The station of claim 45 wherein said key retainer comprises at least one of a hook and peg configured for receiving a key chain or a hole in a single key.

47. The station of claim 23 wherein said sleeve is configured for removably receiving an approximately 3½ inch by 5 inch photograph.

48. The station of claim 23 wherein said sleeve is configured for removably receiving an approximately 4 inch by 6 inch photograph.

49. The station of claim 23 wherein one said frame member comprises a slot configured for removably inserting a picture or photograph into said sleeve.

50. The station of claim 23 wherein said at least one frame member comprises a configuration selected from the group of shapes consisting of a triangle, a square, a rectangle, and a circle.

51. The station of claim 23 wherein said upstanding sides of said receptacle portion further comprise a third exterior portion, said third exterior portion having at least one key retainer secured thereto.

52. The station of claim 23 wherein said viewing window has a surface area between about 15 square inches and about 30 square inches.

53. The station of claim 23 wherein the total lateral width of said station, including said receptacle portion and said accessory portion, is between about 8 inches and about 12 inches.

54. The station of claim 23 wherein said stabilizing means is configured for selectably supporting said station on a surface, said surface comprising one of the surfaces selected from the group consisting of a table, desk ledge, window sill, and countertop.

55. The station of claim 23 further comprising a second receptacle portion secured to said accessory portion on an opposite side thereof from said first receptacle portion, said second receptacle portion being similarly configured as said first receptacle portion.

56. A mobile telephone storage station, comprising: a receptacle portion and an accessory portion, said receptacle portion comprising a bottom, one or more upstanding sides, and a top opening, said sides and said bottom defining a compartment, said sides having first and second exterior portions, said compartment configured for removably receiving a mobile telephone through said top opening, said accessory portion includes a picture frame and a pen and paper holder adjacently secured to said receptacle portion generally opposite said first exterior portion and having a back common with said receptacle portion, said back being partially comprised of said second exterior portion, said back comprising stabilizing means for locating said station as desired.

57. The station of claim 56 wherein said pen and paper holder comprises a generally flat panel having a lateral edge secured to said receptacle portion, said flat panel further comprising a writing utensil retainer and a paper pad retainer.

58. The station of claim 57 wherein said writing utensil retainer comprises a strap.

59. The station of claim 58 wherein said writing utensil retainer is configured to removably retain a writing utensil selected from the group consisting of pens, pencils, markers, and crayons.

60. The station of claim 57 wherein said writing utensil retainer comprises a sleeve.

61. The station of claim 60 wherein said writing utensil retainer is configured to removably retain a writing utensil selected from the group consisting of pens, pencils, markers, and crayons.

62. The station of claim 57 wherein said writing utensil retainer comprises opposing retention brackets, said brackets defining a retention space, said retention space configured for removably receiving a writing utensil therein by frictional engagement of said retention brackets.

63. The station of claim 62 wherein said writing utensil retainer is configured to removably retain a writing utensil selected from the group consisting of pens, pencils, markers, and crayons.

64. The station of claim 57 wherein said paper pad retainer comprises a pocket configured for receiving a pad of paper.

65. The station of claim 64 wherein said pocket comprises a bottom, upstanding side walls, and a front piece extending between said side walls.

66. The station of claim 64 wherein said pocket is configured to removably and closely receive a generally rigid backing from a pad of paper, said pad of paper being cantileveredly supported by said backing retained within said pocket.

67. The station of claim 57 wherein said writing utensil retainer is configured to removably retain a writing utensil selected from the group consisting of pens, pencils, markers, and crayons.

68. A mobile telephone storage station, comprising: a receptacle portion and an accessory portion, said receptacle portion comprising a bottom, one or more upstanding sides, and a top opening, said sides and said bottom defining a compartment, said sides having first and second exterior portions, said compartment configured for removably receiving a mobile telephone through said top opening, said accessory portion includes a picture frame and a key holder adjacently secured to said receptacle portion generally opposite said first exterior portion and having a back common with said receptacle portion, said back being partially comprised of said second exterior portion, said back comprising stabilizing means for locating said station as desired.

69. The station of claim 68 wherein said key holder comprises a generally flat panel having a lateral edge secured to said receptacle, said flat panel having at least one key retainer extending substantially outwardly therefrom.

70. The station of claim 69 wherein said key retainer comprises at least one hook or peg member, said member being configured for removably receiving a key chain or a hole in a single key.

71. The station of claim 69 wherein said key retainer comprises at least one ledge configured for supporting a key or a set of keys on a key chain.

72. The station of claim 68 wherein said upstanding sides of said receptacle portion further comprise a third exterior portion, said third exterior portion having at least one key retainer secured thereto.

73. A mobile telephone storage station, comprising: a receptacle portion and an accessory portion, said receptacle portion comprising a bottom, one or more upstanding sides, and a top opening, said sides and said bottom defining a compartment, said sides having first and second exterior portions, said compartment configured for removably receiving a mobile telephone through said top opening, said accessory portion includes a picture frame and a message board adjacently secured to said receptacle portion generally opposite said first exterior portion and having a back common with said receptacle portion, said back being partially comprised of said second exterior portion, said back comprising stabilizing means for locating said station as desired.

74. The station of claim 73 wherein said message board comprises a generally flat panel having a lateral edge secured to said receptacle portion, said flat panel defining a writing area.

75. The station of claim 74 wherein said message board further comprises a lip configured for retaining one or more suitable writing utensils.

76. The station of claim 75 wherein said suitable writing utensils comprise chalk or markers.

77. The station of claim 75 wherein said lip is further configured for retaining erasing means, said erasing means adapted to erasing markings made in said writing area by one said writing utensil.

78. The station of claim 77 wherein said erasing means comprises a chalk eraser, a marker eraser, or a wiping cloth.

79. The station of claim 74 wherein said writing area has a surface area between about 15 square inches and about 40 square inches.

80. The station of claim 73 wherein said message board comprises a chalk board, a dry-erase board, or a wet-erase board.

* * * * *